United States Patent [19]

Yamamura

[11] 4,408,321

[45] Oct. 4, 1983

[54] DISC-SHAPED RECORDING MEDIUM REPRODUCING APPARATUS

[75] Inventor: Takashi Yamamura, Yokohama, Japan

[73] Assignee: Victor Company of Japan, Ltd., Yokohama, Japan

[21] Appl. No.: 257,183

[22] Filed: Apr. 24, 1981

[30] Foreign Application Priority Data

Apr. 28, 1980 [JP] Japan ............................ 55/58938[U]

[51] Int. Cl.³ .............................................. G11B 1/00
[52] U.S. Cl. .................................................. 369/77.2
[58] Field of Search .......................................... 369/77

[56] References Cited

U.S. PATENT DOCUMENTS 4,196,906 4/1980 Torrington ........................... 369/77
4,220,339 9/1980 Coleman et al. ...................... 369/77

FOREIGN PATENT DOCUMENTS

| 52-71206 | 6/1977 | Japan . |
| 1064911 | 2/1965 | United Kingdom . |
| 1239234 | 10/1968 | United Kingdom . |
| 1414802 | 8/1972 | United Kingdom . |
| 1416588 | 6/1973 | United Kingdom . |
| 1574174 | 3/1976 | United Kingdom . |
| 1540593 | 9/1976 | United Kingdom . |
| 2015237A | 2/1979 | United Kingdom . |
| 2016794A | 3/1979 | United Kingdom . |

Primary Examiner—Steven L. Stephan
Attorney, Agent, or Firm—Louis Bernat

[57] ABSTRACT

A reproducing apparatus reproduces a disc-shaped recording medium which is accommodated within a case. The case comprising a jacket which has a space for accommodating the disc-shaped recording medium and an opening for allowing the disc-shaped recording medium to go in and out of the jacket, and a lid member inserted through the opening of the jacket for closing the opening of the jacket. The reproducing apparatus comprises an inserting opening part through which the case is inserted into the reproducing apparatus, a turntable for rotating the disc-shaped recording medium, and a clamping mechanism for clamping at least one of the disc-shaped recording medium or the lid member provided at the innermost part on the opposite side from the inserting opening part with respect to the turntable. The inserting opening part has an inserting opening which has a shape corresponding to the shape of the case and through which the case is inserted, and guiding members provided at positions relative to the inserting opening and having small frictional resistances for guiding the case so that the case makes contact with the guiding members and not with the inserting opening.

7 Claims, 6 Drawing Figures

DISC-SHAPED RECORDING MEDIUM REPRODUCING APPARATUS

BACKGROUND OF THE INVENTION

The present invention generally relates to disc-shaped recording medium reproducing apparatuses, and more particularly to a disc-shaped recording medium reproducing apparatus capable of placing and leaving a disc-shaped information recording medium in a state possible for reproduction within the reproducing apparatus when a case having a lid for accommodating the recording medium therein is inserted into and then pulled out from within the reproducing apparatus, and also capable of incasing the recording medium within the case so that the recording medium can be obtained outside the reproducing apparatus together with the case, when the empty case is inserted into and then pulled out from within the reproducing apparatus. The present invention further and especially relates to the above reproducing apparatus in which a roller or a lubricous member is provided at an inserting opening of the main body of the reproducing apparatus through which the case is inserted, for reducing the friction between the case and the inserting opening and supporting the case, as well as for keeping the inserting opening free from any scratches.

Conventionally, in an apparatus for reproducing a disc-shaped recording medium (referring to video disc, PCM audio disc, and the like, and hereinafter simply referred to as a disc), there are types of apparatuses in which a disc is reproduced when the disc is loaded upon holding and placing of the disc within the reproducing apparatus, by inserting into and then pulling out a disc case which has a lid and accommodates a disc therein, from within the reproducing apparatus. As a conventional apparatus of this type, there is an apparatus which cooperates with a disc case comprising a rigid jacket for accommodating a disc, and a tray having a front part which is engaged by engaging means upon complete insertion of the disc case within the reproducing apparatus and an annular or ring portion fixed to the front part for encircling the outer periphery of the disc. This conventional reproducing apparatus is constructed so that when this disc case is inserted within the reproducing apparatus to a predetermined position, the engaging means of the reproducing apparatus engages to and holds onto the front part of the tray. Hence, when the jacket is pulled out from within the reproducing apparatus, the disc is held by the annular portion of the tray and relatively slipped out from the jacket at the above predetermined position, and the outer peripheral edge part of the disc rests on and is supported by a supporting mechanism within the reproducing apparatus. Then, a turntable relatively rises within the inner side of the supporting mechanism, and the disc is placed onto and is unitarily rotated with the turntable, to perform the reproduction. After completion of the reproduction, when the empty jacket is inserted into the reproducing apparatus, the disc is relatively inserted into the jacket together with the annular portion of the tray, and the engagement of the engaging means is released. Accordingly, when the jacket is pulled out from the reproducing apparatus, the disc and the tray is obtained outside the reproducing apparatus together with the jacket in a state in which the disc and the tray is incased inside the jacket.

Thus, in the above disc case, for use with the conventional reproducing apparatus, the peripheral side surface of the disc is held by the engaged annular portion of the tray and the disc remains within the reproducing apparatus upon pulling of the jacket outside the reproducing apparatus. Accordingly, a supporting mechanism which is placed with the remaining disc thereon and supports the outer peripheral edge part of the disc, is provided in the reproducing apparatus. Hence, the turntable must be constructed so as to relatively move up-and-down within the inner side of the supporting mechanism. This means that the diameter of the turntable must be smaller than the diameter of the disc, and the outer peripheral edge part of the turntable thus makes contact with and supports the disc at the signal recording surface which is to the inner side of the outer peripheral edge part of the lower disc surface. Therefore, scratches are easily made on the signal recording surface part of the disc which is supported by the turntable, and especially when starting the rotation of the turntable, suffers a disadvantage in that scratches are more easily made in this case due to a force acting in a direction so as to rub the disc. Accordingly, when the disc is used many times, fine reproduction cannot be obtained due to the above scratches formed on the signal recording surface of the disc.

Moreover, upon reproduction, when a reproducing transducer of the reproducing apparatus moves to the position of the signal recording surface on the disc surface, the reproducing transducer must traverse over the annular portion of the tray. This traversing movement accordingly leads to a disadvantage in that the reproducing transducer moving mechanism must be designed so that the reproducing transducer does not collide with the annular portion, and the construction of the mechanism thus becomes complex.

Accordingly, in U.S. patent application entitled "DISC-SHAPED RECORDING MEDIUM REPRODUCING APPARATUS" in which the assignee is the same as that of the present application, a reproducing apparatus was proposed which cooperates with a disc case having a jacket which has a space for accommodating a disc and an opening for allowing the disc to go in and out of the jacket, and a lid member inserted through the opening of the jacket for closing the opening of the jacket, where the reproducing apparatus comprises an inserting opening through which the case is inserted, a turntable for rotating the disc, holding means for holding at least one of the disc and the lid member provided at an inner-most part on the opposite side from the inserting opening with respect to the turntable, lowering and raising means for lowering the disc to a position where the disc is placed on the turntable from a holding position where the disc is held by the holding means upon starting of the reproduction and raising the disc to the holding position from the turntable upon finishing or discontinuing of the reproduction, a reproducing transducer for reproducing the disc placed on the turntable, and moving means for moving the reproducing transducer from a waiting position to a reproducing position with respect to the disc.

On the other hand, upon loading and unloading of the disc, the disc case is inserted into and then pulled out from the reproducing apparatus through the inserting opening provided at the front panel of the reproducing apparatus. In the conventional reproducing apparatus, this inserting opening is simply provided by forming an opening at the front panel of the reproducing apparatus, and thus, the bottom surface of the disc case is rubbed against the edge surface of the inserting opening when the disc case is inserted into and then pulled out from the reproducing apparatus. Accordingly, the resistance introduced due to friction when the disc case is inserted into and pulled out from the reproducing apparatus, is relatively large. This was disadvantageous in that the operation in which the disc case is inserted into and pulled out from the reproducing apparatus, cannot be performed by use of a small force. In addition, since this inserting and pulling operation of the disc case is performed many times, scratches are easily made on the inserting opening of the reproducing apparatus. Furthermore, there is a possibility that the small particles formed as a result of the scratching of the disc case, adhere to the surface of the disc. When these small particles adhere to the signal recording surface of the disc, undesirable effects are accordingly introduced.

SUMMARY OF THE INVENTION

Accordingly, a general object of the present invention is to provide a novel and useful disc-shaped recording medium reproducing apparatus in which the above described problems have been eliminated.

Another and more specific object of the present invention is to provide a disc-shaped recording medium reproducing apparatus which has a member provided at an inserting opening of the reproducing apparatus, for supporting a disc case with small friction therebetween.

Further objects and features of the present invention will be apparent from the following detailed description when read in conjunction with the accompanying drawings.

DETAILED DESCRIPTION

Figure 1:
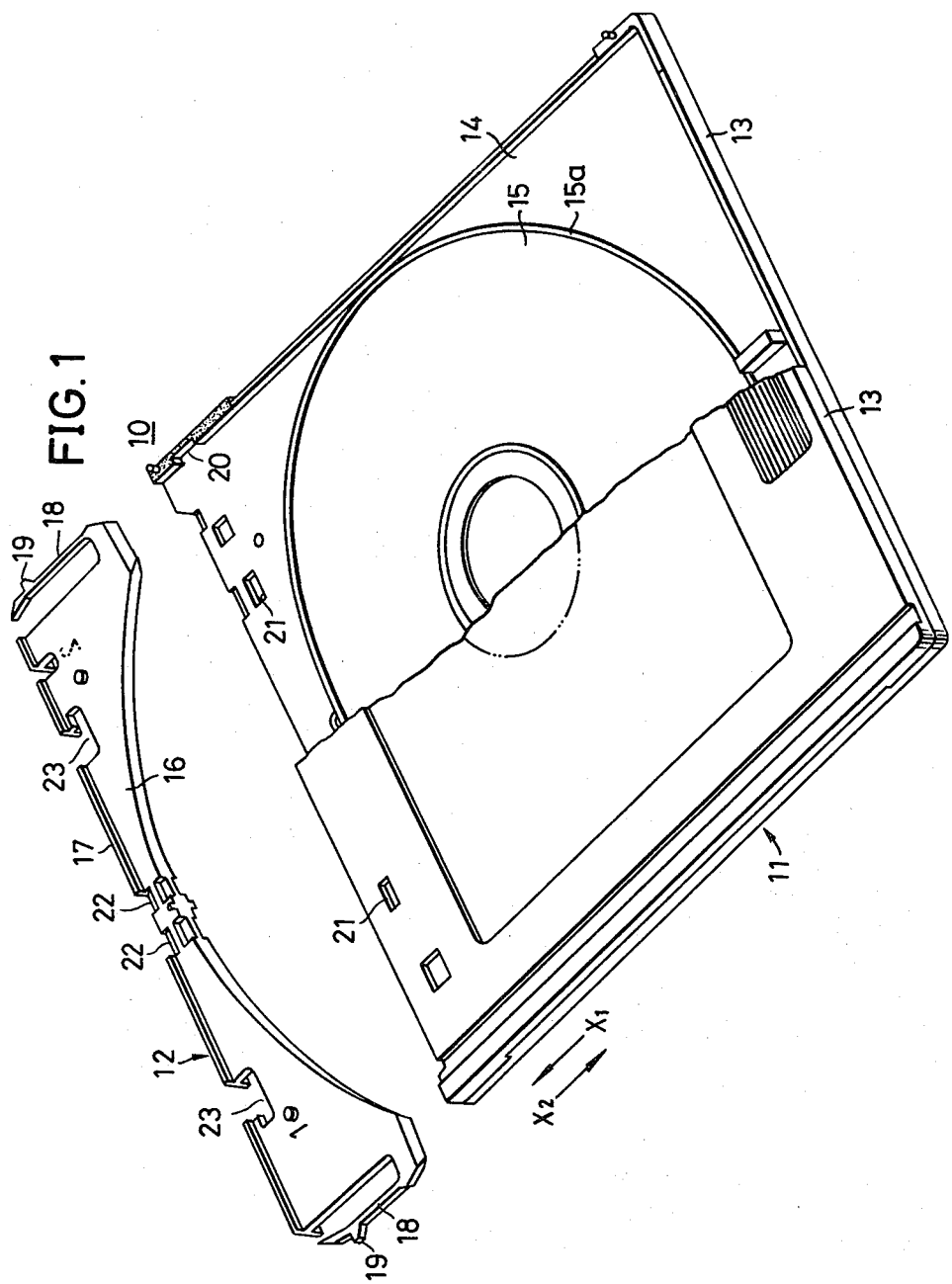
FIG. 1 is a perspective view showing an example of a disc case which operates together with a disc reproducing apparatus according to the present invention, with a part cut away and disassembled.

FIG. 1 shows an example of a disc case which operates together with a disc reproducing apparatus of the present invention, where a disc case 10 comprises a jacket 11 and a lid plate 12.

The jacket 11 is assembled from a pair of jacket halves 13 and 13, and comprises a flat cavity or space 14 therein. This space 14 accommodates a disc 15. The lid plate 12 comprises a plate-shaped main lid body 16, and a rim portion 17 formed unitarily at the front edge of the main lid body 16. A pair of engaging arms 18 are formed on both sides of the main lid body 16. The main lid body 16 of the lid plate 12 is inserted into a predetermined position within the jacket 11. Moreover, a projection 19 of the engaging arm 18 engages into a depression 20, and thus, the lid plate 12 engages with the jacket 11.

Figure 2:
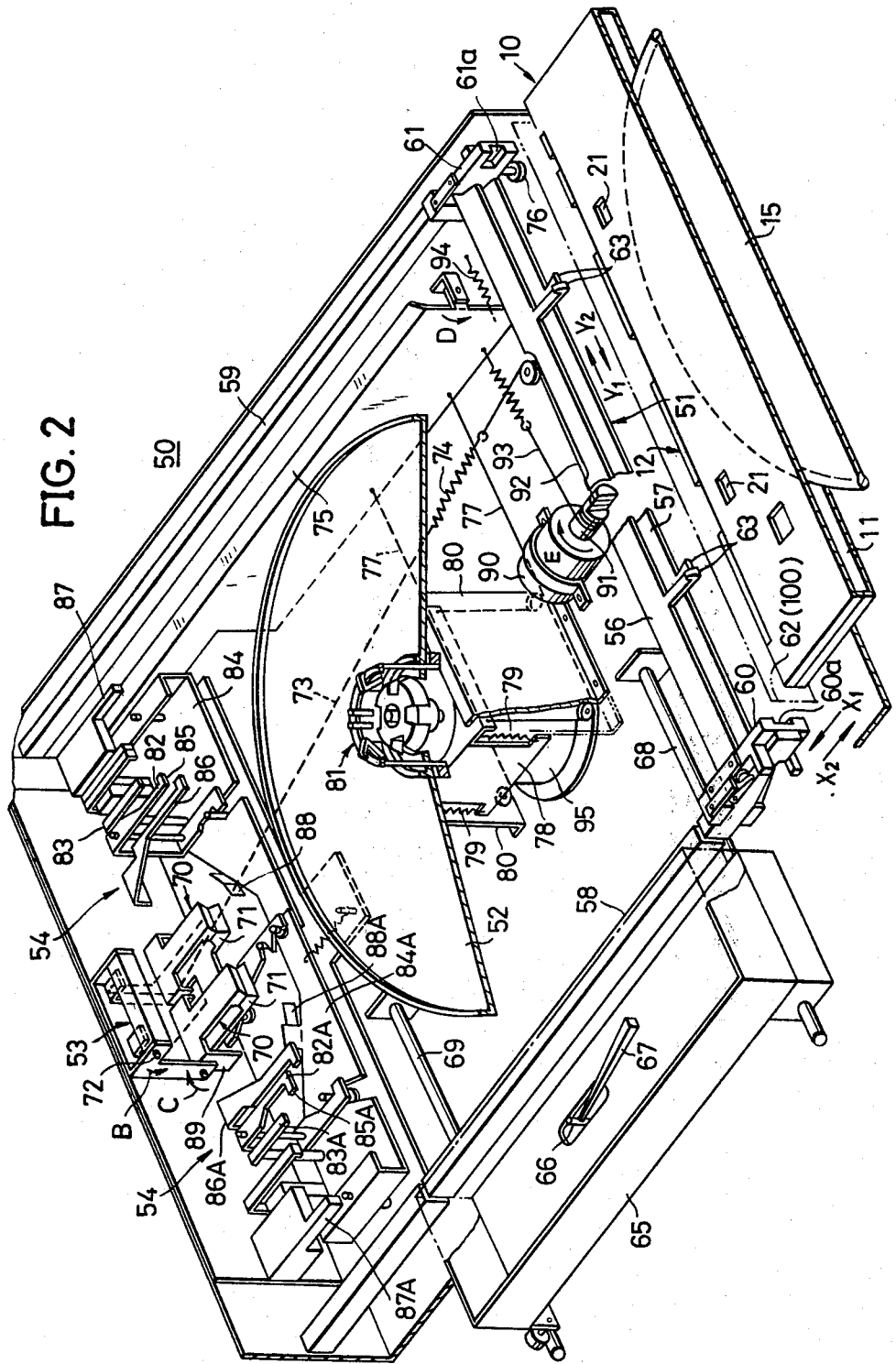
FIG. 2 is a perspective view showing the inner construction of a disc reproducing apparatus according to the present invention, with a part cut away.

As shown in FIG. 2, a reproducing apparatus 50 substantially comprises a jacket opening enlarging mechanism 51, a turntable 52 to rotate the disc 15 positioned thereon, a disc holding mechanism 53 for clamping the disc 15, a lid plate locking mechanism 54 for locking the lid plate 12, and the like.

The jacket opening enlarging mechanism 51 comprises upper and lower beams 56 and 57 extending in the directions of the arrows Y1 and Y2, and supporting members 60 and 61 (sliders) which are respectively fixedly inserted into guide rails 58 and 59, to support both ends of the respective beams 56 and 57. The jacket opening enlarging mechanism 51 is guided by guide rails 58 and 59, and moves between the innermost part of the reproducing apparatus 50 and a disc case inserting opening 62 provided in a panel at the frame of the reproducing apparatus 50, in the directions of the arrows X1 and X2.

Enlarging fingers 63 are respectively formed on each of the beams 56 and 57, directed towards the inserting opening 62. When each of the beams 56 and 57 are positioned on the side of the inserting opening 62, the enlarging fingers 63 mutually close upon each other, and when the beams 56 and 57 move in the direction of the arrow X1, the enlarging fingers 63 rotate in upward and downward directions so as to mutually separate from each other.

A pickup frame 65 is provided with a reproducing stylus 66 and a cantilever 67, and moves in the directions of the arrows Y1 and Y2 along a pair of guide rods 68 and 69.

The disc holding mechanism 53 and the lid plate locking mechanism 54 are constructed symmetrically on the left and right sides with respect to a line which passes through the center of the turntable in the direction of the arrow X1. The parts on the left side are designated by the same reference numerals as the corresponding parts on the right side, with a subscript "A", and their description will be omitted.

The disc holding mechanism 53 is provided at the inner part of the reproducing apparatus 50 on the opposite side of the inserting opening 62, and comprises a pair of upper and lower holding fingers 70 and 71. The lower holding finger 71 is axially supported on an upper pin 72. A wire 73 is linked to the holding finger 71, and the holding finger 71 receives a rotational force in the direction of arrow B due to the force of a spring 74. Accordingly, the holding finger 71 receives a force urging rotation in the upward direction. The upper holding finger 70 is axially supported by a pin.

Upon reproduction of the disc 15, the disc case 10 is inserted through the inserting opening 62 of the reproducing apparatus 50, by inserting the disc case 10 with the side of the lid plate 12 into the direction of the arrow X1. When the jacket opening enlarging mechanism 51 is pushed and moved in the direction of the arrow X1 by the disc case 10. When the enlarging mechanism 51 moves, the upper and lower beams 56 and 57 rotate, and the enlarging fingers 63 thus respectively move in a direction to mutually separate from each other. Accordingly, the tip ends of the enlarging fingers 63 engage with engaging windows 21 of the jacket 11, and enlarge the front part of the upper and lower jacket halves 13 upwards and downwards, to enlarge the opening.

A sloping surface of a rotary plate 75 is pushed by a roller 76 provided on the slider 61, and the rotary plate 75 rotates in the direction of the arrow D, due to the movement of the jacket opening enlarging mechanism 51. Accompanied by the rotation of the rotary plate 75, a wire 77 is pulled, and a push-up plate 78 is accordingly pulled downwards. Four corners of the push-up plate 78 are suspended and supported by springs 79 with respect to a support plate 80. Due to the downward movement of the push-up plate 78, a disc clamping mechanism 81 moves downwards, to retreat from the insertion passage of the disc case 10.

When the disc case 10 is inserted into the inner-most part of the reproducing apparatus 50 together with the enlarging mechanism 51 through the upper side of the turntable 52, ride-over parts 22 of the lid plate 12 enter between the holding parts which are positioned mutually opposite to the holding fingers 70 and 71, and pass through these holding parts by pushing and spreading these parts. The holding fingers 70 and 71 close, as will be described hereinafter, after the ride-over parts 22 of the lid plate 12 have passed through, and the holding parts accordingly clamp a groove guard 15a of the disc 15.

Accompanied by the insertion of the disc case 10, locking fingers 82 and 82A relatively enter inside L-shaped cutouts 23 of the lid plate 12, and the rim portion 17 accordingly pushes contact fingers 83 and 83A. When the contact fingers 83 and 83A are pushed by the lid plate 12, main levers 84 and 84A respectively rotate to be latched. Furthermore, the locking fingers 82 and 82A rotate in directions so as to mutually separate from each other, and L-shaped parts 85 and 85A provided at the tip ends of the above locking fingers 82 and 82A respectively enter into the innermost parts of the cutouts 23, to lock the lid plate 12. The lid plate 12 is limited of its movement in the direction of the arrow X1 by the contact fingers 83 and 83A, and the lid plate 12 is thus locked and supported at the innermost part of the reproducing apparatus 50 in a state in which the lid plate 12 is placed and supported on supporting fingers 86 and 86A.

Furthermore, engagement releasing members 87 and 87A enter inside the openings on the right and left sides of the disc case 10, and push the sloping surfaces at the tip ends of the engaging arms 18. Accordingly, the engaging arms 18 are respectively distorted inwards, and the projections 19 respectively slip out from the depressions 20, to release the engagement of the lid plate 12 with respect to the jacket 11.

When the main levers 84 and 84A rotate to positions where they are latched, the leaf springs 88 and 88A respectively provided at the bent parts of the main levers push against a vertically extending part 89 of the upper holding finger 70. Hence, a rotational force in the direction of the arrow C is applied to the holding finger 70. Thus, the disc 15 is held at a predetermined height by the lower holding finger 71 and the upper holding finger 70.

Accordingly, when the disc case 10 is inserted into the final position, the engagement of the lid plate 12 with respect to the jacket 11 is released, and the disc 15 thus becomes locked by the locking fingers 82 and 82A, and held by the holding fingers 70 and 71.

Next, the jacket 11 is pulled out in the direction of the arrow X2. Since the lid plate 12 and the disc 15 are respectively locked and clamped as described above, only the jacket 11 is moved in the direction of the arrow X2, leaving behind the lid plate 12 and the disc 15. Accompanied by this pulling out of the jacket 11, the lid plate 12 and the disc 15 are relatively pulled out from within the jacket 11.

Accompanied by the movement of the jacket 11 in the direction of the arrow X2, the jacket opening enlarging mechanism 51 also moves together with the jacket in the direction of the arrow X2.

When the jacket 11 is pulled out to the vicinity of the inserting opening 62, the rotary plate 75 rotationally returns and the disc clamping mechanism 81 moves up to support the center part of the disc 15. Furthermore, when the jacket 11 is pulled out, the disc 15 completely separates from the jacket 11, the jacket opening enlarging mechanism 51 returns to its original position, and the jacket opening enlarging fingers 63 rotate in directions so as to mutually close upon each other and separate from the engaging windows 21. The jacket 11 returns to its original state due to its flexibility, and the enlarged opening also returns to the original state, and the jacket 11 is completely pulled out from the reproducing apparatus 50. In this state, the disc 15 is supported horizontally at a position above the turntable 52, by the holding fingers 70 and 71 and the disc clamping mechanism 81.

When a play button (not shown) is then pushed, a motor 90 begins to rotate, and a take-up shaft 91 rotates in the direction of arrow E, and hence wires 92 and 93 are thus pulled out from the take-up shaft 91. Accordingly, the holding finger 71 rotates in a direction opposite to the direction of the arrow B, to release the clamping with respect to the disc 15. Further, the rotary plate 75 is rotated in the direction of the arrow D by a tension spring 94, to move the disc clamping mechanism 81 downwards. Hence, the disc 15 moves down and is placed on the turntable 52, and held by the disc holding mechanism 53 which will be described hereinafter. The pickup frame 65 moves in the direction of the arrow Y1 from the waiting position, and the turntable 52 is rotated by a motor 95. Thus, the disc 15 is relatively scanned by the reproducing stylus 66, to reproduce the information signal.

Next, an operation in which the disc 15 is recovered from within the reproducing apparatus 50, will now be described.

Upon completion of the reproducing operation, the motor 90 rotates in a direction opposite to the direction as the above after the motor 95 and the turntable 52 stop rotating, and the take-up shaft 91 takes up the wires 92 and 93. Accordingly, the rotary plate 75 rotates in a direction so as to loosen the wire 77, and the disc clamping mechanism 81 thus moves up to push the disc 15 up. Furthermore, the holding finger 71 rotates in the direction of the arrow B, to hold the disc 15.

Upon recovering of the disc 15, the empty jacket 11 is inserted with its front end first into the reproducing apparatus 50 through the inserting opening 62. The jacket opening enlarging mechanism 51 is pushed by the jacket 11 and moves again in the direction of the arrow X1, to enlarge the opening of the jacket 11. Accompanied by the insertion of the jacket 11 in the direction of the arrow X1, the disc 15 is relatively inserted inside the jacket 11 through the opening.

When the jacket 11 is inserted into the innermost position inside the reproducing apparatus 50, the disc 15 becomes completely incased within the jacket 11, and furthermore, the locked lid plate 12 is relatively inserted within the opening of the jacket 11.

When the jacket 11 is inserted into the final position, the disc 15 is accommodated within the jacket 11, and the main part of the lid plate 12 which has been locked, is inserted inside the jacket opening.

Therefore, when the jacket 11 is pulled out in the direction of the arrow X2, the lid plate 12 then moves in the direction of the arrow X2 together with the jacket 11, and the disc 15 is pushed by the lid plate 12 and forcibly pushed out in the direction of the arrow X2 by the holding part. Accordingly, the disc 15 separates from the reproducing apparatus 50 to be recovered within the disc case 10.

Figure 3:
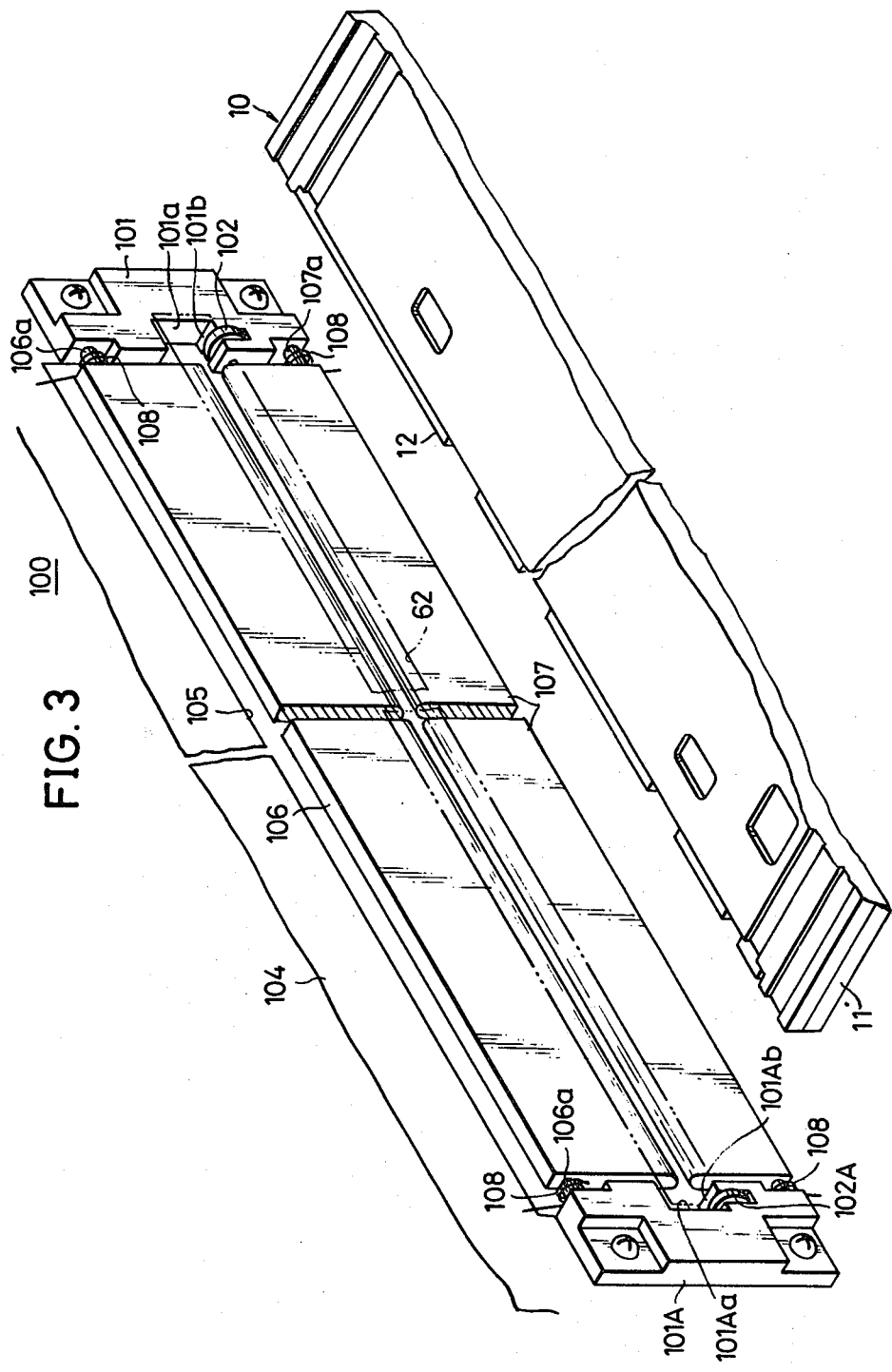
FIG. 3 is a perspective view showing a first embodiment of a disc case inserting opening structure which forms an essential part of the reproducing apparatus according to the present invention.
Figure 4A:
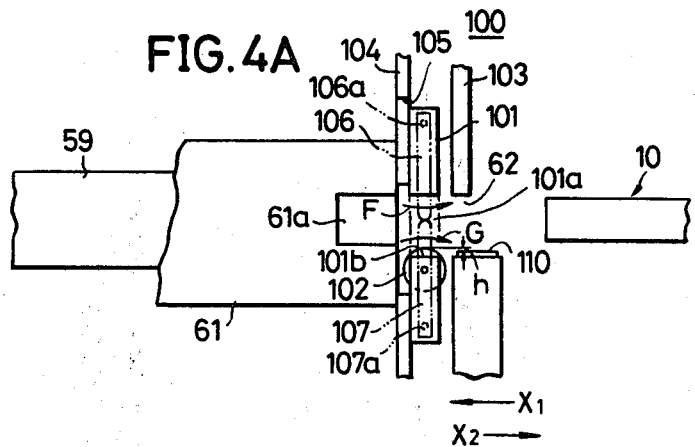
FIGS. 4A and 4B are cross-sectional diagrams respectively showing the disc case inserting opening structure shown in FIG. 3, in a state before insertion of the disc case and in a state during insertion of the disc case.
Figure 4B:
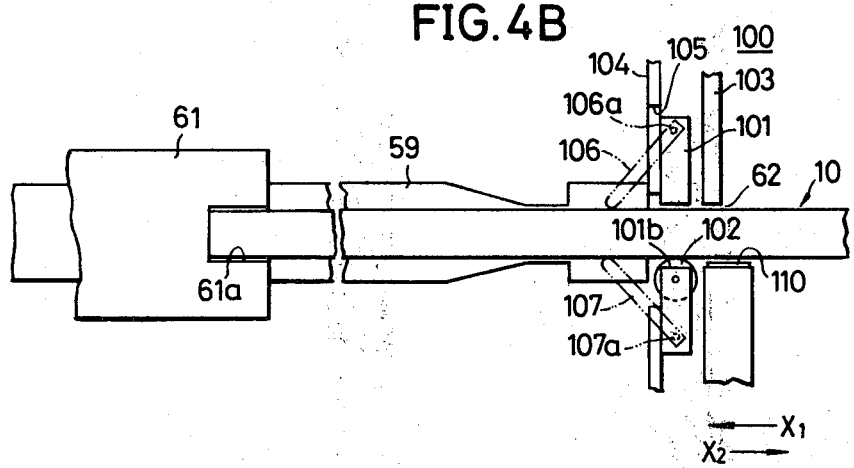

Next, a first embodiment of a disc case inserting opening structure which forms an essential part of the reproducing apparatus according to the present invention, will be described in conjunction with FIGS. 3, 4A, and 4B. In FIGS. 3, 4A, and 4B, those parts which are the same as those corresponding parts in FIG. 2 are designated by the like reference numerals, and their description will be omitted.

Disc case inserting opening structure 100 substantially comprises rollers 102 and 102A respectively provided on supporting members 101 and 101A.

The disc case inserting opening 62 is an opening having a long and narrow shape, respective of the shape of the disc case 10, and is provided in a front panel 103 at the front surface of the reproducing apparatus 50. The supporting members 101 and 101A are respectively fixed by screws at positions opposing the left and right ends of the disc case inserting opening 62, on a frame 104 at the rear side of the front panel 103. A large opening 105 is formed in the frame 104, extending between the left and right supporting members 101 and 101A. Rotary doors 106 and 107 are respectively provided within this opening 105. Left and right shaft portions 106a and 107a of these rotary doors 106 and 107, are respectively axially supported by the supporting members 101 and 101A, and the rotary doors 106 and 107 respectively rotate within the opening 105. Furthermore, these rotary doors 106 and 107 are respectively urged to rotate in the directions of the arrows F and G by springs 108. Before insertion of the disc case 10 into the reproducing apparatus 50, the rotary doors 106 and 107 respectively are in vertical states to close the disc case inserting opening 62 from the rear side, as shown in FIGS. 3, 4A, and 4B.

U-shaped depressions 101a and 101Aa are respectively formed on the supporting members 101 and 101A, in positions opposing the left and right ends of the disc case inserting opening 62. The rollers 102 and 102A are respectively provided on bottom surfaces 101b and 101Ab of the depressions 101a and 101Aa, in a state where portions of the rollers 102 and 102A project. In addition, a lubricous member 110 made of nylon and the like for reducing resistance due to friction, is fixed on the lower side surface of the disc case inserting opening 62. The roller 102 (102A) projects in the direction towards the center of the inserting opening 62, by a distance h from the lubricous member 110.

The disc case 10 is inserted into the reproducing apparatus 50 through the inserting opening 62 in the direction of the arrow X1 as shown in FIGS. 4A and 4B. Accordingly, the tip end side of the disc case 10 pushes the rotary doors 106 and 107 to rotationally open these rotary doors 106 and 107 against the springs 108, and the left and right end portions of the disc case 10 are respectively inserted into depressions 60a and 61a of the sliders 60 and 61. The disc case 10 is inserted into the reproducing apparatus 50 in a state where the left and right ends of the disc case 10 in the inserting direction, are respectively supported by the sliders 61 and 60 which move along the guide rails 59 and 58. With respect to the portions of the disc case 10 which pass through the depressions 101a and 101Aa, the bottom surfaces of the disc case 10 make contact with the rollers 102 and 102A, and the disc case 10 accordingly moves accompanied by the rotation of the rollers 102 and 102A. Therefore, the portions of the dics case 10 which enter within the reproducing apparatus 50 are separated from the lubricous member 110, and are supported by the rolling friction of the rollers 102 and 102A. Accordingly, the disc case inserting operation can be smoothly performed by use of a small force. Moreover, as the disc case 10 is inserted into the reproducing apparatus 50, the weight component of the disc case 10 which acts on the inserting opening 62 increases, and the supporting effect of the rolling friction is most effectively introduced in a state where the disc case 10 is inserted into the innermost part of the reproducing apparatus 50.

Furthermore, the lower surface of the inserting opening 62 is formed so that the lower surface projects in front from the entrance portion of the inserting opening 62. Accordingly, the tip end side of the disc case 10 is stably placed on the projecting portion provided at the lower surface of the inserting opening 62 upon insertion of the disc case 10, and the position of the disc case 10 is determined with respect to the inserting opening 62. When the tip end sides of the disc case 10 move within the inserting opening 62 until reaching the depressions 101a and 101Aa, the disc case 10 is supported by a small sliding friction due to the lubricous member 110, and thereafter supported by the rollers 102 and 102A.

After insertion of the disc case 10, in both operating modes in which the jacket 11 is pulled out, and in which the empty jacket 11 is inserted into the reproducing apparatus 50 and pulled out as the disc case 10, the rollers 102 and 102A and the lubricous member 110 respectively operate in similar manners as those described above.

Accordingly, the force exerted against the insertion and pulling out of the disc case 10 (jacket 11) is small, and the insertion and pulling out of the disc case 10 can thus be performed smoothly by use of a small force. Moreover, even when the above inserting and pulling out operation of the disc case 10 is performed many times, the bottom surface of the jacket 11 is prevented from being scratched by the edges of the inserting opening 62, and hence, bad effects due to particles formed as a result of the scratching of the disc case 10.

Additionally, the case inserting opening 62 is prevented from being scratched even when the above inserting and pulling out operation of the disc case 10 is performed many times.

In the above described construction, the same part supports the depression 101a and the rotary doors 106 and 107. Accordingly, the number of parts required and the manufacturing cost can be reduced compared to the case where the parts and the supporting parts are separate parts.

Figure 5:
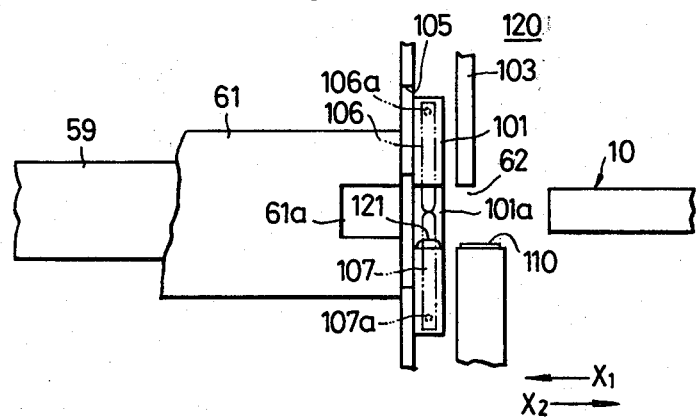
FIG. 5 is a cross-sectional diagram showing a second embodiment of a disc case inserting opening structure which forms an essential part of the reproducing apparatus according to the present invention.

A second embodiment of a disc case inserting opening structure according to the present invention will now be described in conjunction with FIG. 5. In FIG. 5, those parts which are the same as those corresponding parts in FIG. 4A are designated by the like reference numerals, and their description will be omitted.

A disc case inserting opening structure 120 is provided with a lubricous member 121 such as nylon, in the depression 101a of the supporting member 101, instead of the roller 102. The disc case 10 slides against a small sliding friction resistance over the lubricous member 121, at the insertion opening 62 of the reproducing apparatus 50, and substantially same effects are obtained as in the embodiment of the invention described above. Furthermore, the construction of the present embodiment of the invention is more simple compared to that of the above embodiment of the invention.

The material used for the lubricous member 121 is not limited to the above nylon member, and may be a metal member or a hard synthetic resin member with a metal plated surface. In addition, the roller 102 or the lubricous member 121 can also be provided at the side surface of the depression 101a in the supporting member 101, instead of being provided only on the bottom surface 101b of the depression 101a in the supporting member 101. In this case, the disc case 10 is smoothly guided into the reproducing apparatus 50 with respect to the left and right side end surfaces of the depressions, in addition to the guiding provided with respect to the bottom surfaces of the depressions.

Further, this invention is not limited to these embodiments but various variations and modifications may be made without departing from the scope of the invention.

What is claimed is:

1. A reproducing apparatus for reproducing a disc-shaped recording medium which is accommodated within a case, said case comprising a jacket which has a space for accommodating said disc-shaped recording medium and an opening for enabling said disc-shaped recording medium to go in and out of said jacket, and a lid member inserted through said opening of said jacket for closing said opening of said jacket, said reproducing apparatus comprising:

a panel defining an inserting opening through which said case is inserted into said reproducing apparatus, said inserting opening having edges defining a shape generally corresponding to approximately the shape of said case;

a turntable for rotating said disc-shaped recording medium;

clamping means for clamping at least one of said disc-shaped recording medium or said lid member at an inside part of the reproducing apparatus which is opposite the panel defining said inserting opening, with said turntable located between said inside part and said panel; and guiding members made of a material which is different from the material of said edges of said inserting opening, said guiding members being positioned adjacent an edge of said inserting opening and arranged to protrude within said inserting opening to prevent a direct contact between said case and said edge of said inserting opening.

2. A reproducing apparatus as claimed in claim 1 in which said protection members are rollers which are rotated by operations in which said case is inserted into and pulled out from said reproducing apparatus via said inserting opening.

3. A reproducing apparatus as claimed in claim 1 in which said protection members are members having nylon surfaces.

4. A reproducing apparatus as claimed in claim 1 in which said protection members are metal members having smooth surfaces.

5. A reproducing apparatus as claimed in claim 1 in which said protection members are members made of hard synthetic resin having metal plated surfaces.

6. A reproducing apparatus as claimed in claim 1 in which said protection members are disposed at the lower sides on the right and left sides within said inserting opening through which said case is inserted, and a pair of members for supporting and guiding the right and left end portions of the bottom surface of said case.

7. A reproducing apparatus as claimed in claim 1 in which said insertion opening part is formed so that a lower surface projects in front of the inserting opening, and said projected lower surface has inserting opening protection members thereon.

* * * * *